United States Patent Office 3,338,866
Patented Aug. 29, 1967

3,338,866
AGE RESISTORS FOR RUBBER POLYMERS
Ronald B. Spacht, Kent, Ohio, assignor to The Goodyear Tire & Rubber Company, Akron, Ohio, a corporation of Ohio
No Drawing. Filed Nov. 22, 1963, Ser. No. 325,766
8 Claims. (Cl. 260—45.95)

This invention relates to age resistors for oxidizable organic materials, their preparation and use in the stabilization of organic materials such as rubber, gasoline, oils, etc., which tend to deteriorate when exposed to normal atmospheric conditions, and in particular when exposed to sunlight and/or elevated temperatures in the presence of air or oxygen.

Rubber, both natural and synthetic, has proven to be one of the most difficult organic materials to successfully stabilize against the deleterious effects of oxygen and ozone. Both cured and uncured natural and synthetic elastomers are susceptible to the deleterious effects that are found in normal atmospheric conditions, and although many materials have been suggested and used as rubber stabilizers, no completely satisfactory material has been found that will fully protect rubber under the widely different conditions to which it is subjected. The search for new and better rubber stabilizers is therefore a problem which continues to command the attention of many skilled investigators.

Phenolic compounds have been among the more commonly used class of compounds that have found wide scale acceptance as rubber stabilizers, but many of the phenolic antioxidants, although reasonably effective stabilizers for organic materials, tend to impart discoloration and staining to the materials they are intended to stabilize. An additional problem that is not successfully solved by many of the previously known phenolic stabilizers is that they are in varying degrees susceptible to being too readily volatilized, and they therefore escape from the materials that they are intended to stabilize during the rather extended service life to which such materials are subjected.

It is therefore an object of this invention to provide a new class of phenolic antioxidants. Another object of this invention is to provide a new class of stabilizers for organic compounds that are relatively non-discoloring and non-volatile.

In accordance with the present invention it has been found that the foregoing and additional objectives can be accomplished by employing as stabilizers for organic materials which are subject to the deleterious effects of oxygen, ozone and sunlight, phenolic compounds selected from the group consisting of alkoxy 2″ butenylene bis phenols and polymers thereof. Preferred compounds of the present invention conform to the following structural formula.

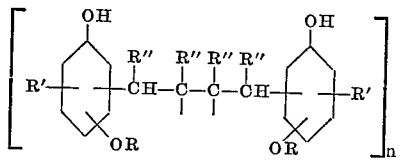

wherein R is selected from the group consisting of alkyl radicals containing from 1 to 12 carbon atoms, cycloalkyl radicals containing from 5 to 6 carbon atoms, benzyl radicals and phenylethyl radicals, R' is selected from the group consisting of hydrogen and alkyl radicals containing from 1 to 12 carbon atoms, R" is selected from the group consisting of hydrogen and alkyl radicals containing 1 to 4 carbon atoms, and $n$ is an integer from 1 to 5. When $n$ is 1 in the above formula, the free bonds shown become a double bond. When $n$ is more than 1 the double bond opens and add on to similar molecules forming dimers, trimers and polymers.

Examples of specific compounds that conform to the above-recited structural formula are:

2,2'-(2″-butenylene)-bis-(4-methoxy-6-tert.butyl phenol)
2,2'-(2″-butenylene)-bis-(4-methoxy phenol)
2,2'-(2″-butenylene)-bis-(3-methoxy phenol)
2,2'-(2″-butenylene)-bis-(6-methoxy phenol)
2,2'-(2″-butenylene)-bis-(4-ethoxy phenol)
2,2'-(2″-butenylene)-bis-(4-butoxy phenol)
2,2'-(2″-butenylene)-bis-(4-methoxy-6-tert.hexyl phenol)
2,2'-(2″-butenylene)-bis-(4-ethoxy-6-tert.amyl phenol)
4,4'-(2″-butenylene)-bis-(2-methoxy-6-tert.butyl phenol)
4,4'-(2″-butenylene)-bis-(2-methoxy phenol)
4,4'-(2″-butenylene)-bis-(3-methoxy phenol)
4,4'-(2″-butenylene)-bis-(2-butoxy-6-tert.amyl phenol)
4,4'-(2″-butenylene)-bis-(2-methoxy-6-methyl phenol)
2,2'-(2″-butenylene)-bis-(4-methoxy-3-methyl phenol)
2,2'-(2″-butenylene)-bis-(3-methoxy-6-ethyl phenol)
2,2'-(2″-butenylene)-bis-(4-benzyloxy-6-tert.butyl phenol)
2,2'-(2″-butenylene)-bis-(4-cyclohexyloxy-6-tert.butyl phenol)
2,2'-(2″-1″ methyl butenylene)-bis-(4-methoxy phenol)
2,2'-(2″-2″ methyl butenylene)-bis-(4-methoxy-6-methyl phenol)
2,3'-(2″-butenylene)-bis-(4-methoxy phenol)
2,3'-(2″-1″ methyl butenylene)-bis-(4-butoxy phenol)
2,2'-(2″-butenylene)-bis-(4-cyclohexyloxy-6-tert.butyl
2,4'-(2″-1″ methyl butenylene)-bis-(3-methoxy-6-tertiary butyl phenol)

In accordance with the above-recited structural formula polymers of any of the above-listed monomeric compounds are also to be considered as examples of stabilizers of the present invention.

The most preferred compounds of the present invention are in particular those which conform to the following structural formula wherein the linking portion of the molecule is derived from 2-butene:

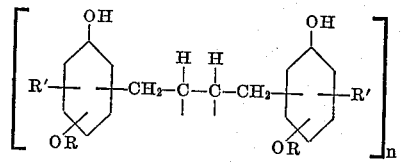

wherein R is selected from the group consisting of alkyl radicals containing from 1 to 12 carbon atoms, cycloalkyl radicals containing from five to six carbon atoms, benzyl radicals and phenylethyl radicals, R' is selected from the group consisting of hydrogen and tertiary alkyl radicals containing from 4 to 12 carbon atoms and $n$ is an integer from 1 to 5. When $n$ is 1 in the above formula the free bonds shown become a double bond.

Specific compounds conforming to the above-recited preferred structure are:

2,2'-(2″-butenylene)-bis-(4-methoxy-6-tert.butyl phenol)
2,2'-(2″-butenylene)-bis-(4-isopropoxy-6-tert.amyl phenol)
2,2'-(2″-butenylene)-bis-(4-butoxy-6-tert.hexyl phenol)
2,2'-(2″-butenylene)-bis-(4-hexyloxy-6-tert.octyl phenol)
2,2'-(2″-butenylene)-bis-(4-octyloxy-6-tert.butyl phenol)
2,2'-(2″-butenylene)-bis-(4-dodecyloxy-6-tert.butyl phenol)
2,2'-(2″-butenylene)-bis-(5-benzyloxy-6-tert.butyl phenol)
2,2'-(2″-butenylene)-bis-(4-cyclohexyloxy-6-tert. amyl phenol)

The compounds of this invention may be prepared by reacting alkoxy phenols or alkyl substituted alkoxy phenols with β,β' dihalo olefins either in the presence or absence of a catalyst which will catalyze a dehydrohalogenation reaction. Preferred catalysts are zinc, zinc chloride, iron, ferrous oxide and acid activated clay. The above-described catalysts promote both the dehydrohalogenation and polymerization reactions, to produce a polymeric material of relatively high molecular weight which display low volatility. These reactants are normally reacted at elevated temperatures for a period of 1 to 5 hours in an inert organic solvent. Preferred solvents are the aromatic and aliphatic hydrocarbons boiling between 50 to 150° C. Examples of preferred solvents are hexanes, heptanes, cyclohexane, toluene, benzene and xylene. The reaction is most conveniently carried out at a temperature between 100 to 150° C. At least two moles of the alkoxy phenol is reacted with each mole of β,β' dihalo olefin.

The compounds of this invention may be prepared by reacting an alkoxy phenol with a β,β' dihalo olefin in accordance with the above-described procedure and then subsequently reacting the reaction product of the first reaction with an additional olefinic material. Alternatively, the compounds of the invention may be prepared by reacting an alkyl substituted alkoxy phenol with a β,β' dihalo olefin to produce the desired compounds by a one-step process.

The alkoxy phenols which can be used as initial reactants to produce compounds of the present invention conform to the following structural formula

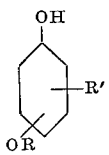

wherein R is selected from the group consisting of alkyl radicals containing from 1 to 12 carbon atoms, cycloalkyl radicals containing from 5 to 6 carbon atoms, benzyl radicals and phenylethyl radicals, and R' is selected from the group consisting of hydrogen and alkyl radicals containing from 1 to 12 carbon atoms.

Examples of specific compounds that conform to the above-recited structural formula are:

(o,m,p-methoxy phenol)
(o,m,p-ethoxy phenol)
(o,m,p-isopropoxy phenol)
(o,m,p-butoxy phenol)
(o,m,p-cyclohexyloxy phenol)
(o,m,p-benzyloxy phenol)
4-methoxy-2-methyl phenol
4-methoxy-3-methyl phenol
2-tert.-butyl-4-methoxy phenol
3-tert.-butyl-4-methoxy phenol
2-methoxy-4-tert.-butyl phenol The diahalo olefins that may be used as reactants in the preparation of compounds which conform to the present invention must have halogen atoms attached to both of the carbon atoms that are located beta to the double bond. These dihalo olefins conform to the following structural formula:

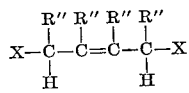

wherein R'' is selected from the group consisting of hydrogen and alkyl radicals containing from 1 to 4 carbon atoms and X is selected from the group consisting of chlorine, bromine, and iodine. Specific examples of dihalo olefins that are useful in the practice of the present invention include:

1,4-dichloro-2-butene
1,4-dibromo-2-butene
2-methyl-1,4-dichloro-2-butene
1,4-dichloro-2-pentene
1,4-dibromo-2-pentene
2,5-dichloro-3-hexene
2,5-dibromo-3-hexene
3,6-dichloro-4-octene
1,4-diiodo-2-butene
1-bromo-4-chloro-2-butene The following specific examples showing the preparation of compounds conforming to the present invention are intended to be illustrative of the class of compounds disclosed and a method of their preparation but are not to be interpreted as limitations of the invention.

EXAMPLE 1

One hundred and eighty grams of mono-butylated-p-methoxy-phenol, 5.0 grams of fused ZnCl$_2$ and 75 grams of 1,4-dichlorobutene-2 where heated together. After a short time there was a vigorous evolution of HCl. Heating was continued for two hours at a temperature between 110 and 120° C. Na$_2$CO$_3$ was added to precipitate the ZnCl$_2$. Toluene was added for dilution and the neutralized catalyst filtered off. The product was heated to remove toluene and unreacted materials. One hundred and seventy-eight grams of a soft resinous product were obtained.

EXAMPLE 2

One hundred and eighty-six grams of p-methoxy phenol and two grams of fused ZnCl$_2$ were heated to 105° C. and then 65 grams of 1,4 dichloro-2-butene were added solwly during two hours. The mixture was stirred an additional hour. Then Na$_2$CO$_3$ was added and the unreacted materials removed. One hundred and nineteen grams of product were obtained. The product (114 grams) was dissolved or slurried in 200 mls. of toluene and three grams of H$_2$SO$_4$ added. The mixture was heated to 95° C. and 31 grams of isobutylene added in a period of one hour. The product after removal of toluene was dissolved in alcohol and filtered. The filtrate was heated to 210° C. at 35 mm. pressure to remove volatiles. Weight of the product was 126 grams.

EXAMPLE 3

One hundred and eighty-six grams of p-methoxy phenol and two grams of ZnCl$_2$ were heated to 105° C. and 65 grams of 1,4-dichlorobutene-2 added slowly in about two hours. The mixture was heated at 105° C. and additional hour before adding 2.0 grams of Na$_2$CO$_3$ to destroy the catalyst. The reaction mixture was heated to 200° C. at 27 mm. pressure to remove unreacted materials. One hundred and forty-two grams of a soft resinous product were obtained.

The compounds of this invention have found one of their greatest utilities as rubber stabilizers. They are useful in protecting raw rubber in latex form, coagulated rubber and vulcanized rubber. They are highly efficient and are capable of being employed in relatively small amounts to effectively stabilize the rubbers into which they are incorporated. The precise amount of these highly effective stabilizers which is to be employed will depend somewhat on the nature of the rubber and the severity of the deteriorating conditions to which the rubber is to be exposed. It has been found that an effective antioxidant amount of the disclosed stabilizers will generally range from 0.05 to 5.0 percent by weight based on the weight of the rubber although it is generally preferred to use from 0.5 to 2.0 percent by weight based on the weight of the rubber. The effective proportions may also be defined as ranging from approximately 0.05 to 5.0 parts by weight per 100 parts by weight of rubber.

The rubbers that may be conveniently protected by the phenolic compounds in accordance with this invention are the cured and uncured oxidizable rubbery polymers such as natural rubber and those synthetic oxidizable rubbery polymers which are normally susceptible to deterioration by sunlight and atmospheric oxygen. By the term "oxidizable rubbery polymers" as employed in this application is meant natural rubber, the synthetic rubbery polymers and copolymers of conjugated dienes and the polymeric olefins. Representative examples of synthetic oxidizable rubbery polymers which are normally susceptible to deterioration by sunlight and atmospheric oxygen include polychloroprene; polyisoprenes and polybutadienes and in particular polyisoprenes and polybutadienes having essentially all of their monomer units combined in a cis-1,4 structure; the rubbery copolymers of butadiene and styrene which may contain from 50 to 90 percent or more of butadiene; and butyl rubber which is a polymerization product of a major proportion of a mono-olefin and a minor proportion of a multi-olefin such as a butadiene or isoprene; polyolefins containing little or no unsaturation such as polyethylene, polypropylene, ethylene propylene and terpolymers of ethylene propylene.

In order to evaluate the effectiveness of the compounds of this invention as stabilizers for rubber one part by weight of representative members of the compounds of this invention per 100 parts by weight of rubber were incorporated into samples of the following rubber formulation wherein all proportions are expressed as parts by weight per 100 parts by weight of rubber.

Extracted pale crepe _____ 100.00
Zinc oxide _____ 5.00
Sulfur _____ 3.00
Hexamethylenetetramine _____ 1.00
Stearic acid _____ 1.50
Antioxidant _____ 1.00

The stocks were cured for 50 minutes at 285° F. The antioxidant efficiency of the various additives was measured by aging samples by the method described in ASTM-D-572-52 for 24, 48 and 72 hours in an oxygen bomb at 300 p.s.i. and at 70° C. Tensile at break was determined as described below.

Portions of the above-described cured rubber samples were subjected to an autographic tensile test according to the following procedure. Test samples of the above-described cured rubber stock were cut in a dumbbell design from a rubber sheet approximately 0.080 inch thick. The thin portion of the dumbbell used for the test was 0.398 inch wide. A portion of this thin section 3.5 centimeters long was used for the test. These test specimens were placed in a test apparatus designed to automotically record changes in elongation with applied stress. The stress at the time the sample breaks is called tensile at break. The results were recorded on graph paper with stress in pounds per square inches plotted on the ordinate and elongation on the abscissa. Before subjecting the samples to stress they were allowed to stand for 24 hours at 77° F. and 50 percent relative humidity. The samples are pulled at the rate of 30 inches per minute. The results obtained upon evaluation of the above-described rubber stocks are recorded below in Table I.

Table I

| Antioxidant | | Percent Tensile Retention | | |
|---|---|---|---|---|
| | | 24 Hrs. | 48 Hrs. | 72 Hrs. |
| 1 | Control (no antioxidant) | 0 | | |
| 2 | R.P.[1] butylated-p-methoxy phenol and 1,4 dichlorobutene-2 | 122 | 52 | 37 |
| 3 | Resin from p-methoxy phenol and 1,4 dichlorobutene-2 | 103 | 54 | 46 |
| 4 | Butylated resin from 3 | 97 | 59 | 55 |

[1] R.P. means reaction product.

The increase in weight of the samples aged by the method described in ASTM-D-572-52 was determined. The values observed are summarized in Table II.

Table II

| Antioxidant | | Percent Weight Increase | | |
|---|---|---|---|---|
| | | 24 Hrs. | 48 Hrs. | 72 Hrs. |
| 1 | Control (no antioxidant) | 17.0 | | |
| 2 | R.P.[1] butylated-p-methoxy phenol and 1,4 dichlorobutene-2 | 0.23 | 0.47 | 0.59 |
| 3 | Resin from p-methoxy phenol and 1,4 dichlorobutene-2 | 0.47 | 0.74 | 0.85 |
| 4 | Butylated resin from 3 | 0.39 | 0.58 | 0.81 |

[1] R.P. means reaction product.

The stabilizing efficiency of typical compounds of the present invention was evaluated in Plioflex 1502 polymers. This polymer is a typical SBR rubber prepared by a cold polymerization procedure and containing approximately 75 percent bound butadiene and 25 percent bound sytrene. One percent of the stabilizers shown in Table III was incorporated into the above-described polymer and the samples then subjected to an oxygen absorption test in accordance with the procedure described in Industrial & Engineering Chemistry, vol. 38, p. 71 (1946). The time required for the various samples to absorb one percent oxygen is shown in the following table.

Table III

Antioxidant: Hrs. to 1% $O_2$—70° C.
(1) R.P. of butylated-p-methoxy phenol and 1,4 dichlorobutene-2 _____ 337
(2) Resin from p-methoxy phenol and 1,4 dichlorobutene-2 _____ 425
(3) Butylated resin from No. 2 _____ 475
(4) Control (no antioxidant) _____ 8

R.P. means reaction product.

Having provided a complete description of the invention in such manner as to distinguish it from other inventions and from what is old, and having provided a description of the best mode contemplated of carrying out the invention, the scope of patent protection to be granted the invention is defined by the following claims.

What I claim is:
1. The reaction product resulting from the reaction of a mixture containing (1) at least two moles of an alkoxyl phenol conforming to the following structural formula

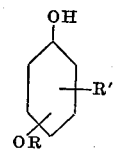

wherein R is selected from the group consisting of alkyl radicals containing from 1 to 12 carbon atoms, cycloalkyl radicals containing from five to six carbon atoms, benzyl radicals and phenylethyl radicals and R' is selected from the group consisting of hydrogen and alkyl radicals containing from 1 to 12 carbon atoms and (2) approximately one mole of a dihalo olefin conforming to the following structural formula

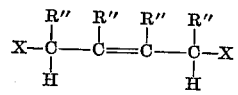

wherein R'' is selected from the group consisting of hydrogen and alkyl radicals containing from 1 to 4 carbon atoms and X is selected from the group consisting of chlorine, bromine and iodine.

2. The reaction product resulting from the reaction at a temperature between 100 and 150° C. of a mixture containing (1) at least two moles of p-methoxy phenol with (2) approximately one mole of 1,4 dichloride-2-butene.

3. The reaction product prepared by a two-step process, the first step comprising reacting at a temperature between 100 and 150° C. a mixture containing (1) at least two mols of p-methoxy phenol with (2) approximately one mol of 1,4 dichloro-2-butene, and the second step comprising reacting the reaction product of the first step with isobutylene.

4. The reaction product resulting from the reaction at a temperature between 100 and 150° C. of a mixture containing (1) at least two mols of mono-butylated-p-methoxy phenol with (2) approximately one mol of 1,4-dichloro-2-butene.

5. An oxidizable polymer selected from the group consisting of polychloroprene, polyisoprenes, polybutadienes, copolymers of butadiene and styrene containing at least 50 percent bound butadiene, butyl rubber, polyethylene, polypropylene, copolymers of ethylene and propylene and terpolymers of ethylene and propylene containing an antioxidant amount of the reaction product according to claim 1.

6. An oxidizable polymer selected from the group consisting of polychloroprene, polyisoprenes, polybutadienes, copoylmers of butadiene and styrene containing at least 50 percent bound butadiene, butyl rubber, polyethylene, polypropylene, copoylmers of ethylene and propylene and terpoylmers of ethylene and propylene containing an antioxidant amount of the reaction product according to claim 2.

7. An oxidizable polymer selected from the group consisting of polychloroprene, polyisoprenes, polybutadienes, copolymers of butadiene and styrene containing at least 50 percent bound butadiene, butyl rubber, polyethylene, polypropylene, copolymers of ethylene and propylene and terpolymers of ethylene and propylene containing an antioxidant amount of the reaction product according to claim 3.

8. A oxidizable polymer selected from the group consisting of polychloroprene, polyisoprenes, polybutadienes, copolymers of butadiene and styrene containing at least 50 percent bound butadiene, butyl rubber, polyethylene, polypropylene, copolymers of ethylene and propylene and terpolymers of ethylene and propylene containing an antioxidant amount of the reaction product according to claim 4.

References Cited

UNITED STATES PATENTS

| | | | |
|---|---|---|---|
| 2,060,715 | 11/1936 | Arvin | 260—61 |
| 2,453,298 | 11/1948 | Bloch | 260—61 |
| 2,455,254 | 11/1948 | Jarowski et al. | 260—613 |
| 2,542,111 | 2/1951 | Block | 260—61 |
| 2,688,625 | 9/1954 | Bell et al. | 260—613 |

DONALD E. CZAJA, *Primary Examiner.*

LEON J. BERCOVITZ, *Examiner.*

H. E. TAYLOR, *Assistant Examiner.*

UNITED STATES PATENT OFFICE
CERTIFICATE OF CORRECTION

Patent No. 3,338,866                          August 29, 1967

Ronald B. Spacht

It is hereby certified that error appears in the above numbered patent requiring correction and that the said Letters Patent should read as corrected below.

Column 2, line 29, for "2,2'-(2"-butenylene)-bis-(4-cyclohexyloxy-6-tert. butyl" read -- 3,3'-(2" -2" butyl butenylene)-bis-(2-methoxy phenol) --; column 4, line 31, for "solwly" read -- slowly --; line 46, for "and" read -- an --.

Signed and sealed this 19th day of November 1968.

(SEAL)
Attest:

Edward M. Fletcher, Jr.                          EDWARD J. BRENNER
Attesting Officer                                Commissioner of Patents